May 19, 1936.   G. A. SQUIER   2,041,440
MOUNTING FOR OPHTHALMIC LENSES
Filed Nov. 18, 1932

INVENTOR.
George A. Squier.

BY Corbett + Mahoney
ATTORNEYS.

Patented May 19, 1936

2,041,440

UNITED STATES PATENT OFFICE 2,041,440

MOUNTING FOR OPHTHALMIC LENSES

George A. Squier, Cleveland, Ohio

Application November 18, 1932, Serial No. 643,228

2 Claims. (Cl. 88—47)

My invention relates to mountings for ophthalmic lenses. It has to do, more particularly, with a lens clamp of novel form which is adapted to be used for attaching the bridge member, the temples, or other members to the edge of a lens. It is particularly applicable to rimless eyeglasses and spectacles, although it is not necessarily limited thereto.

It is a well known fact that rimless glasses are possessed of certain undesirabilities. Some of these undesirabilities are due to the fact that up to this time there has been no satisfactory clamp devised for attaching the bridge member to the lenses or for connecting the temples or other members to the lenses. All of the clamps which have been used heretofore, have either been of such a type as to cause breakage of the lenses when they were being attached thereto, or have been of such a structure that they tend to become loose on the lens with the result that they cause breakage of the lens, become completely detached therefrom, or with other undesirable results. Furthermore, lens clamps which have been devised heretofore, are usually of such a structure that they are expensive to manufacture and are difficult to apply to the lenses.

The most common type of lens clamp now in use comprises a member which is adapted to fit over the edge of the lens and to be secured thereto by means of a screw passing through openings in such member and a corresponding opening which is drilled entirely through the lens. This clamp member usually consists of a main strap member which is adapted to abut against the edge of the lens and two legs which extend from such strap member, each of these legs being adapted to contact with a side surface of the lens. These legs usually extend at right angles to the main strap member of the clamp and are provided with openings in their outer ends adapted to coincide with the opening in the lens.

In applying to a lens a clamp of the prior art type, indicated above, the drilling of the hole entirely through the lens results in a high percentage of breakage. Furthermore, it will be understood that with a prior art clamp of this type it is necessary to distort the clamp so that all portions thereof will firmly contact with the lens in order that the lens will be tightly held therein. When the clamp is distorted so that it will fit a certain lens, it usually causes the openings in the outer ends of the legs to become out of alignment with each other and with the opening extending through the lens. Consequently, this either makes it impossible or difficult to pass the screw therethrough, or causes the screw to set up a strain on the glass of the lens with the result that the lens will be broken while the clamp is being applied thereto or at a subsequent time while in use. Likewise, if the screws are set down too tightly the lenses are often cracked or broken by the strains set up thereby.

It has been found that, when a prior art clamp of the type indicated has been in use for a while, the screws become loose and consequently, the entire clamp on the lens is loosened. This results in undesirable movement or disalignment. Furthermore, if the clamps are not properly fitted on a certain lens, which is a difficult operation, the lens will be loose and may be moved back and forth, or may be moved up and down and consequently, the pair of lenses of a spectacle or eyeglass may be thrown out of their original horizontal alignment.

Since the inception of rimless glasses and spectacles, there has been a constant endeavor in the art to overcome the disadvantages of the prior art clamp indicated above. Many different kinds of clamps have been devised to take the place of such prior art clamp, but none up to the present time have proved practical enough to be used by the trade to any considerable extent.

One of the objects of my invention is to provide a lens clamp which is inexpensive to manufacture and which may be readily applied to a lens.

Another object of my invention is to provide a lens clamp which may be applied to a lens without drilling a hole therethrough, and which will be securely attached to the lens and will not become loose thereon.

Another object of my invention is to provide a lens clamp which will fit any type of lens, and which may be readily and effectively applied to any type of lens without distorting the body portion of such clamp to make it contact with the various surfaces of the lens.

In its preferred form my invention contemplates the provision of a lens clamp which has a body portion mainly of tubular form which is arcuately curved throughout its length. This arcuate tubular body portion is formed by producing a flat stamping from a piece of metal. This stamping is then bent into tubular form but not completely closed so that a slot is produced which extends the entire length thereof. The tubular member is made of some metal which is resilient and yet which is strong enough to tightly grip the edge of the lens, when it is inserted therein as will be explained hereinafter. The tubular member may also, if desired, be provided with two legs extending therefrom at each side of the said slot. These legs are adapted to fit over the edge of the lens and to contact with the side surfaces thereof. One of the legs may be provided with an opening to receive a dowel pin which is adapted to cooperate with a small depression in one side of the lens.

The slot in the tubular member is preferably, before application, narrower than the thickness of the lens to which it is to be applied. When the clamp is mounted on the lens the adjacent edges of the piece of metal which forms the tubular body portion are spread apart so that the slot will be sufficiently wide to receive the edge of the lens. After the lens has been slipped in the tubular body portion, it will tend to spring back to its original position and, therefore, will tightly grip the lens. Furthermore, the legs extending from the tubular body portion will also grip the sides of the lens and the dowel pin inserted in the opening formed in the outer end of one of the legs will extend into a corresponding depression formed in the lens.

The preferred embodiment of my invention is shown in the accompanying drawing wherein similar characters of reference designate corresponding parts, and wherein.

Figure 1:
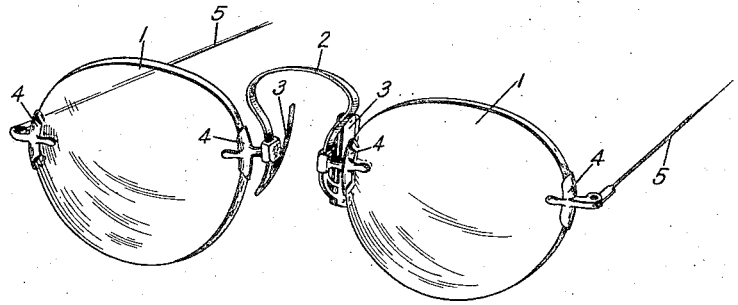
Figure 1 is a perspective view of a pair of spectacles having lens clamps, made in accordance with my invention, applied thereto.

With reference to the drawing, and particularly to Figure 1, I have shown a pair of spectacles having my invention applied thereto. These spectacles comprise the lenses 1 which are secured together by means of a bridge member 2. This bridge member is shown as being provided with guards 3 suitably secured thereto. The bridge member 2 is secured to the edges of the lenses 1 by clamp members 4, made in accordance with my invention. The spectacles are further provided with temples 5 which are also secured to the lenses 1 by means of my novel form of lens clamps 4.

Figure 2:
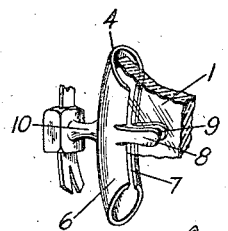
Figure 2 is a perspective view of a lens clamp made in accordance with my invention.

As shown in Figure 2, each of the lens clamps 4 comprises a body portion 6 which is mainly of cylindrical form, but is arcuately curved throughout its length. This body portion 6 is produced by stamping it from suitable metal and then forming it into the desired shape. The adjacent edges of the piece of metal, which forms the tubular body portion, are not brought together but are spaced apart so as to form a slot 7, on one side of the tubular body portion and extending the entire length thereof. This slot is comparatively narrow so that when a lens is inserted therein, as will be hereinafter described, it will be necessary to spread the adjacent edges of the metal of the tubular body portion apart so that the slot will be made sufficiently wide to receive the edge of the lens. The tubular body portion is preferably stamped from some metal which is resilient but which will be sufficiently strong that it will firmly grip the lens.

Figure 11:
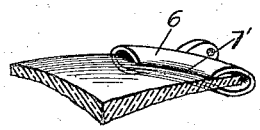
Figure 11 is a perspective view of a portion of a lens and showing how the arcuate tubular body portion, which is embodied in all the various forms of my clamp, is adapted to fit on the lens.

When the lens is inserted in the tubular member, the edges 7' of the slot will grip the lens. These edges will be the only portion of the tubular member which will grip the side surfaces of the lens. The tubular body portion 6 is shown as being arcuately curved throughout its length. Therefore, the contacting edges 7' of the tubular body portion will also have a corresponding curvature (Figure 11).

The body portion 6, when formed, is not necessarily arcuately curved to correspond to the curvature of the edge of the lens but the arc of curvature thereof has its center corresponding to the geometrical center of the lens. The radius of curvature of the arcuate body portion is preferably made substantially one-half the width of the average lens, so that the clamp will fit any type of lens. Thus, the edges 7' of the tubular body portion 6 will contact with the lens along an arcuate line. Therefore, if the lens is a spherical lens, the edges 7' will contact with the lens throughout the length of such edges, whether the surfaces of the lens with which they contact are convex or concave. This will prevent wobbling of the clamp on the lens, which would otherwise occur if the line of contact of the edges 7' with the lens were straight instead of arcuate.

When the clamp is applied to a lens having a spherical surface on each side, both of the edges 7' will contact with the side surfaces of the lens throughout the length of such edges. If the lens is not spherical, but is toric, the edges 7' may not contact with the surfaces thereof throughout their length. However, one of the surfaces of the lens is usually spherical so that at least one of the edges 7' will contact firmly, substantially throughout its length, with one of the surfaces of the lens.

Even though the tubular body portion 6 of the lens clamp will not always correspond in shape to the edge of the lens, when the lens is inserted therein, the edge of the lens will always have a substantial area of contact with the inner wall of the tubular member and the gripping action of the edges of the tubular body portion will, at all times, effectively maintain this contact. Furthermore, the unchanging arcuate form of the body portion which cannot be bent endwise results in a highly desirable rigidity lacking in prior art devices.

The tubular body portion 6 is also provided with a pair of legs 8 which may be formed integrally therewith or which may be welded or secured thereto in any suitable manner. One of these legs is disposed at each side of the slot 7 and projects outwardly from the tubular body portion 6. The lens is adapted to be inserted between these legs 8 and each of the legs is adapted to firmly contact with a side surface of such lens. One of the legs 8, preferably the one disposed on the rear surface of the lens, is provided with an opening adjacent its outer end to receive a dowel pin 9. This dowel pin 9 is adapted to cooperate with a slight depression which is formed in the surface of the lens, in a manner to be hereinafter described. However, it will be understood that in place of the dowel pin 9, the arm 8 may be provided with a lug integrally formed upon the end of such arm or other type of projection.

The clamp 4 is provided with an arm 10 which is welded or otherwise secured to the body portion thereof. This arm 10 may be used for attaching the clamp to the bridge, the temples, or any other such members, in any of the well known ways.

Figure 6:
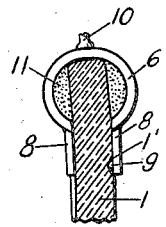
Figure 6 is a section of a lens having a comparatively thick outer edge showing how my clamp may be applied thereto.
Figure 7:
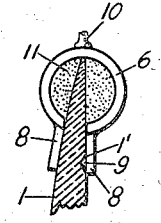
Figure 7 is a view similar to Figure 6 showing a lens having a strong convex curvature on one surface thereof and how my clamp may be applied thereto.
Figure 8:
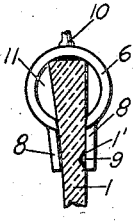
Figure 8 is a view similar to Figures 6 and 7 showing a lens having a strong concave curvature on one surface thereof, and how my clamp may be applied thereto.

When it is desired to apply my clamp to a lens a shallow depression 1' is first formed in the inner surface of the lens. This depression 1' is so located that when the clamp is fitted on the edge of the lens the dowel pin 9 will extend thereinto. As previously stated, the slot 7 will, before application, be of less width than the thickness of the lens to which it is desired to apply the clamp. Therefore, the walls of the slot and the arms 8 will be spread apart sufficiently so that the edge of the lens may be slipped therebetween. The lens is slipped between the arms 8 and the walls of the slot 7 and is moved rearwardly until the edge of the lens contacts with the rear wall of the tubular body portion 6, as shown in Figures 6, 7 and 8. When the lens is properly positioned in the clamp member, the dowel pin 9 will extend into the depression 1' formed in the lens. Furthermore, because of the fact that the body portion 6 is made of resilient material, and because of the fact that the body portion of the clamp is made in the form of a tube, the walls 7' of the slot 7 will tend to spring together and the edge of the lens will, therefore, be tightly gripped by the tubular member. As previously stated, the edges 7' will usually firmly contact with the surfaces of the lens substantially throughout the length of such edges. The arms 8 will also firmly contact with the surfaces of the lens and will aid in holding the clamp and the lens together, and the dowel pin 9 will cooperate with the depression 1' to further prevent withdrawal of the edge of the lens from the clamp.

In Figures 6, 7 and 8, I have shown the preferred form of my lens clamp applied to several different types of lenses. It will be apparent that the arcuately curved tubular body portion 6 will fit over the edge of any lens, no matter what form it takes. Furthermore, the lens will be tightly gripped and the clamp will be firmly attached thereto.

It will be understood that with this form of lens clamp it will not be necessary to use cement, or other substances. However, as clearly shown in Figures 6, 7 and 8, the diameter of the tubular member 6, is greater than the thickness of the lens to which it is applied and therefore, a pocket 11 is formed on each side of the lens and these pockets may be filled with cement, if desired.

Figure 3:
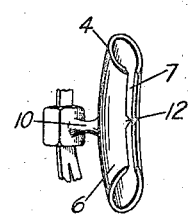
Figure 3 is a perspective view of a modified form of my invention.
Figure 9:
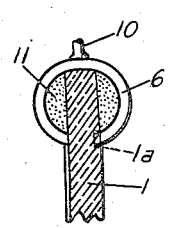
Figure 9 is a section of a lens showing how the modified form of lens clamp shown in Figure 3 may be applied thereto.

In Figure 3, I have shown a slightly modified form of lens clamp. This clamp is similar to that shown in Figure 2 in that it comprises an arcuate tubular body portion 6. This body portion 6 is also made of resilient material from which it is stamped and is then formed into a proper shape. This tubular body portion 6 is also provided with a slot 7 extending the length thereof. One of the walls of the slot is provided with a lug 12 projecting therefrom. As shown in Figure 9, when this clamp is applied to a lens the lug 12 is adapted to project into a shallow depression 1a which is formed in the surface of the lens. It will be understood, however, that any number of lugs 12 may be provided which will cooperate with corresponding depressions formed in the surface of the lens. The slot 7 in this instance is also comparatively narrow so that after the lens is inserted therein it will be tightly gripped. In this instance, again it will not be necessary to use cement although it may be used, if desired.

Figure 4:
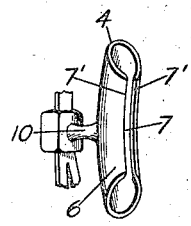
Figure 4 is a perspective view of another modified form of my invention.
Figure 5:
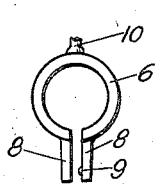
Figure 5 is an end elevation of the preferred form of my lens clamp showing it before it is applied to a lens.
Figure 10:
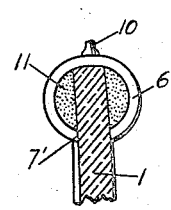
Figure 10 is a view similar to Figure 9 showing how the modified form of lens clamp shown in Figure 4 may be applied to a lens.

In Figure 4, I have shown another modified form of my lens clamp. This form is substantially identical with that shown in Figure 3 with the exception that in this instance the lug 12 is eliminated. When a clamp of this type is used it may be desirable to use cement. However, when a lens is inserted in the slot 7 the tubular member will tightly grip the lens edge and will tend to prevent removal of the clamp therefrom. In Figure 10, I have shown how this form of clamp may be applied to the lens.

It will be understood, however, that certain features of my device are advantageous even when used with a lens having a hole extending entirely therethrough. This is true, even though a screw should also be used.

Figure 12:
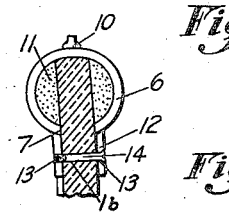
Figure 12 shows another modified form of my invention.

Thus, Figure 12 shows another modified form of my invention applied to a lens having a hole drilled therethrough. This clamp is similar to those previously described and is provided with an arcuate tubular body portion 6. The body portion 6 is made of resilient material and is provided with a slot 7 extending along one side thereof and being adapted to receive the edge of lens 1. The tubular body portion 6 is provided with a pair of outwardly extending legs 12 one of which is disposed on each side of the slot 7. Each of these legs 12 is provided with aligning openings 13 formed therein. When the lens is inserted in the tubular member 6, these openings 13 are adapted to correspond with an opening 1b which is drilled entirely through the lens. The openings 13 and the opening 1b are adapted to receive a screw 14.

It will be understood that with this form of my invention the tubular body portion 6 will resiliently grip the lens and hold it therein. The lens and the clamp will also be held together by means of the screw 14 which passes through the openings formed in the lens and the legs 12. It will be apparent that it will not be necessary to distort the body portion 6 in order to have it fit the edge of the lens. Therefore, there will be no strains set up on the edge of the lens. Furthermore, since it is not necessary to distort the body portion of the clamp, the openings 13 in the legs 12 will always coincide with each other and with the opening 1b in the lens. Thus the screw may be passed through the corresponding openings without setting up any strains on the lens which would be set up if the openings in the lens and the legs of the clamp were not in coincidence, as would occur in prior art clamps employing screws and a body portion which must be distorted to fit various surfaces of the lens.

Even if the screw did become loose, causing the legs 12 to spread, the clamp would not become loose on the lens, due to the fact that the tubular body portion 6 firmly grips the lens.

It will be understood from the above description that I have provided a lens clamp which is extremely simple in structure and which will be inexpensive to manufacture. It will also be obvious that this lens clamp may be readily applied to a lens in such a manner that it will not readily become detached therefrom. It will also be understood that a clamp made in accordance with my invention will fit over the edge of any lens of any type and it will not be necessary to distort the body portion of the clamp in order to get it to fit a certain type of lens.

Having thus described my invention, what I claim is:

1. An ophthalmic mounting including a rimless lens, a lens clamp for use on said lens, comprising a comparatively short body portion of tubular form made of spring metal and of substantially C-shaped cross-section, the space between the open jaws of said body portion being of less width than the thickness of the outer edge of said lens to which it is to be applied so that the jaws must be forced apart when the outer edge of the lens is inserted between said jaws, the body portion having a diameter which is substantially greater than the thickness of the portion of the lens which is to be inserted therein so that there will be a space within the body portion between the wall thereof and the side surfaces of the portion of the lens inserted therein, the inner surface of said body portion at that side opposite to where the open jaws are formed, serving as a bearing with which the extreme outer edge of said lens will contact, the jaws of said body portion being adapted to grip the side surfaces of said lens, said body portion being arcuately curved throughout its length in accordance with the curvature of the edge of said lens so that said jaws will contact with the side surfaces of said lens along an arcuate line and substantially throughout the length of said body portion.

2. An ophthalmic mounting including a rimless lens, a lens clamp for use on said lens, comprising a comparatively short body portion of tubular form made of spring metal and of substantially C-shaped cross-section, the space between the open jaws of said body portion being of less width than the thickness of the outer edge of said lens to which it is to be applied so that the jaws must be forced apart when the outer edge of the lens is inserted between said jaws, the body portion having a diameter which is substantially greater than the thickness of the portion of the lens which is to be inserted therein so that there will be a space within the body portion between the wall thereof and the side surfaces of the portion of the lens inserted therein, the inner surface of said body portion at that side opposite to where the open jaws are formed, serving as a bearing with which the extreme outer edge of said lens will contact, the jaws of said body portion being adapted to grip the side surfaces of said lens, and a pair of arms projecting from said body portion and extending over the side surfaces of said lens, one of said arms having a projection thereon adapted to fit into a depression in the side surface of the lens.

GEORGE A. SQUIER.